Sept. 6, 1949.  N. BORSUK  2,481,192
TENSION ADJUSTER FOR WINDSHIELD WIPERS
Filed June 2, 1945
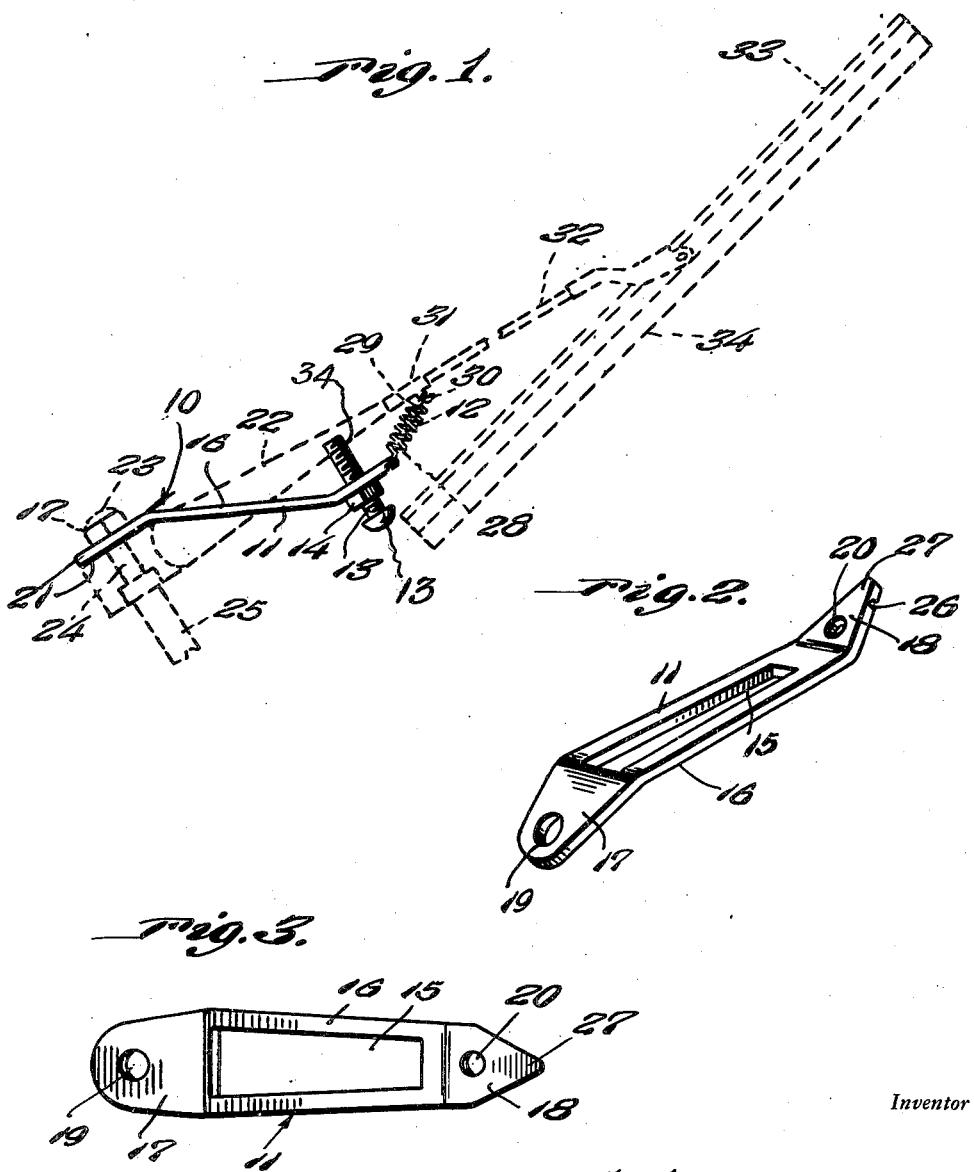
Inventor
Nicholas Borsuk
By Clarence A. O'Brien
and Harvey B. Jacobson
Attorneys

Patented Sept. 6, 1949

2,481,192

UNITED STATES PATENT OFFICE 2,481,192

TENSION ADJUSTER FOR WINDSHIELD WIPERS

Nicholas Borsuk, Woodbridge, N. J.

Application June 2, 1945, Serial No. 597,169

2 Claims. (Cl. 15—250)

1

This invention relates to automobiles and has for its object to provide means whereby the pressure of a windshield wiper may be readily adjusted.

Another object of the invention is to provide an attachable tensioning device for windshield wiper arms.

Other features and advantages will become more readily apparent from the following description and the accompanying illustrative drawings in which:

Figure 1 is a side elevational view of a windshield wiper showing my tensioning device in operative position thereon, Figure 2 is a perspective view of a tension support, and Figure 3 is a plan view thereof.

In the accompanying drawings as above enumerated and in the following specification, like characters of reference indicate like parts throughout and in which 10, is a tension control device which consists of a resilient bracket 11, a spring 12, and a screw 13, with a lock nut 14. The bracket 11, is formed of sheet metal with a longitudinal aperture 15, extending the length of its inclined body portion 16, and has its terminals 17 and 18, inclined relative to the body to form parallel seats, each of which is provided with a bore, 19 and 20, respectively. The terminal 17, seats upon the top wall 21, of the channel member 22, to which the wiper arm is fixed and is secured by the cap nut 23, of the bolt 24, which secures the member 22, to its shaft 25, the upper end of bolt 24 passing through the bore 19.

The member 22, projects through the slot 15, and the screw 13, is threaded through bore 20, in the terminal 18. Secured to the notch 26, in the extreme pointed end 27, of member 18, is one end 28, of the coil spring 12, the other end 29, of which is detachably connected to a hook 30, fixed on the end 31, of member 22. The lock nut 14, seats against the under surface of said terminal 18.

The tension upon the arm 32, of the windshield wiper 33, may now be very easily adjusted by turning screw 13, the end 34, of which bears against the member 22, clockwise or anti-clockwise to draw or relax spring 12, through up or down movement of terminal 18, which is secured in adjusted position by the lock nut. In order to attach or remove the device it is only necessary to release the spring end 29, from hook 30, and disconnect the wiper 33, from the arm 31, whereby said arm will readily pass through slot 15.

With my above described device the exact desired tension of the wiper blade 34, upon a windshield may be easily and quickly obtained to secure the desired results therefrom, whereas the wipers will often not function properly because of insufficient or too much tension, which cannot be adjusted.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details and parts such as come within the purview of the invention claimed may be resorted to, in actual practice, if desired.

Having now described my invention that which I claim as new and desire to procure by Letters Patent is:

1. A tensioning control device for a windshield wiper arm consisting of a resilient bracket member having parallelly bent ends with one end secured to a drive shaft, a spring connected between the other end of said bracket and the wiper arm and means for adjusting the tension of the spring, said adjusting means consisting of a screw threaded in said other end and bearing against the arm, a lock nut for said screw bearing against said other end holding said screw in adjusted position, and said bracket having an aperture intermediate said ends through which said arm projects.

2. A tensioning control device for a windshield wiper arm consisting of a resilient bracket member having parallelly bent ends with one end secured to a drive shaft, a spring connected between the other end of said bracket and the wiper arm and means for adjusting the tension of the spring, said adjusting means consisting of a screw threaded in said other end and bearing against the arm, a lock nut for said screw bearing against said other end holding said screw in adjusted position, and said bracket having an aperture intermediate said ends through which said arm projects, so that said ends are disposed on opposite sides of said arm, said one end being apertured to receive said one end of the drive shaft.

NICHOLAS BORSUK.

REFERENCES CITED

The following references are of record in the file of this patent:

UNITED STATES PATENTS

| Number | Name | Date |
|---|---|---|
| 1,626,629 | Sayre | Apr. 3, 1927 |
| 1,681,724 | Demand | Aug. 21, 1928 |
| 1,816,370 | Hachenberg | July 28, 1931 |
| 2,156,505 | Marcolivio | May 2, 1939 |
| 2,269,623 | Ehrlich | Jan. 13, 1942 |
| 2,295,620 | Zaiger | Sept. 15, 1942 |